(12) United States Patent
Broadley et al.

(10) Patent No.: US 8,290,526 B2
(45) Date of Patent: Oct. 16, 2012

(54) WIRELESS GROUND SUPPORT SYSTEMS

(75) Inventors: Simon Broadley, West Lynn, OR (US);
Brian VanderPloeg, Lake Oswego, OR (US)

(73) Assignee: Sonetics Corporation, Portland, OR (US)

( * ) Notice: Subject to any disclaimer, the term of this patent is extended or adjusted under 35 U.S.C. 154(b) by 0 days.

(21) Appl. No.: 13/244,596

(22) Filed: Sep. 25, 2011

(65) Prior Publication Data
US 2012/0225685 A1    Sep. 6, 2012

Related U.S. Application Data

(60) Provisional application No. 61/448,399, filed on Mar. 2, 2011.

(51) Int. Cl.
*H04W 4/08* (2009.01)
(52) U.S. Cl. .................... 455/518; 455/3.05; 455/41.2
(58) Field of Classification Search ............... 455/3.05, 455/63.1, 78, 222, 431, 501, 518, 41.1–41.3, 455/519; 381/74, 370
See application file for complete search history.

(56) References Cited

U.S. PATENT DOCUMENTS

| 4,451,705 | A  | * | 5/1984  | Burke et al. ............. 379/265.11 |
| 2003/0062447 | A1 | * | 4/2003  | Cordina et al. ............ 244/118.5 |
| 2003/0103489 | A1 | * | 6/2003  | Dezonno et al. ............ 370/351 |
| 2007/0287447 | A1 | * | 12/2007 | Cornell ....................... 455/431 |
| 2008/0057858 | A1 | * | 3/2008  | Smith ........................ 455/3.05 |
| 2008/0059053 | A1 | * | 3/2008  | Cox et al. ...................... 701/121 |
| 2008/0064332 | A1 | * | 3/2008  | Lee et al. ...................... 455/41.2 |
| 2009/0164122 | A1 | * | 6/2009  | Morbey et al. ................ 701/301 |
| 2010/0002893 | A1 | * | 1/2010  | Theverapperuma et al. ... 381/82 |
| 2011/0013780 | A1 | * | 1/2011  | Yamkovoy ..................... 381/58 |
| 2011/0269411 | A1 | * | 11/2011 | Yamkovoy et al. ............. 455/78 |
| 2011/0275401 | A1 | * | 11/2011 | Fettig et al. ................... 455/518 |

OTHER PUBLICATIONS

Ceotronics, Inc., Ceotronics Airline and Airports, Oct. 2009, 12 pages, Ceotronics, AG.
Ceotronics, Inc., CT-DECT Systems Tech Data, Oct. 2009, 16 pages, Ceotronics, AG.
Ceotronics, Inc., CT-DECT GateCom Systems, Apr. 2007, 4 pages, Ceotronics, AG.

* cited by examiner

*Primary Examiner* — Cong Tran
(74) *Attorney, Agent, or Firm* — Keith L. Jenkins, Registered Patent Attorney, LLC; Keith L. Jenkins

(57) ABSTRACT

A wireless intercom has a releasably coupled wired interface to an external aircraft communications socket and the wireless intercom is coupled to the aircraft proximate the socket, preferably in a custom bag hung by a releasable mechanical coupling to the aircraft. The wireless intercom provides signal communication and management between a ground crew tug driver headset and the pilot via the socket and, in various embodiments, to a trainer headset and/or to one or more wing walker headsets. If the wireless intercom loses communications with the tug operator headset during ground operations, an alarm is sent to the pilot via the socket. The wireless intercom, in alternate embodiments, enforces a priority scheme for calls going to one or more of the headsets. The wireless intercom and headsets are powered by rechargeable batteries. Each embodiment includes a customized weather-resistant case for holding at least the other elements of that embodiment.

20 Claims, 5 Drawing Sheets

WIRELESS GROUND SUPPORT SYSTEMS

RELATED APPLICATIONS

This application claims the benefit of U.S. Provisional patent Application 61/448,399 filed Mar. 2, 2011 to the same inventors.

TECHNICAL FIELD

The present invention generally relates to wireless communication systems for ground crews at airports and more particularly relates to wireless communication systems for ground crews at airports handling large aircraft.

BACKGROUND

When large aircraft, such as commercial airliners, are approaching or leaving a passenger gate, ground crews must supervise the movement of the aircraft in coordination with the pilot. The crew typically includes a tug operator, and two wing walkers. The wing walkers each are responsible for observation of one wing tip for the purpose of collision avoidance. The communications systems for ground crews must balance accessibility to various crew members with the need to prevent communications overload, wherein everybody is talking and no one can listen. A number of wireless systems have been developed. The present invention represents the next advancement in the art of ground crew communications.

Accordingly, it is desirable to provide a wireless communications system for communications between the pilot and the crew that ensures proper connectivity and overload control. In addition, it is desirable to provide a system for communicating between a tug operator and a pilot. In addition, it is desirable to provide a system for communicating between a tug operator, a trainer, and a pilot. In addition, it is desirable to provide a system for communicating between a tug operator, two wing walkers, and a pilot. In addition, it is desirable to provide a wireless communications system that provides for safety, longevity, and mobility. In addition, it is desirable to provide for a warning signal if portions of the system are left connected to the aircraft after pushback from the gate. Furthermore, other desirable features and characteristics of the present invention will become apparent from the subsequent detailed description and the appended claims, taken in conjunction with the accompanying drawings and the foregoing technical field and background.

BRIEF SUMMARY

A system is provided for wireless communications system for communications between a pilot and a ground crew that ensures proper connectivity and overload control. A first embodiment includes an intercom bag with a wired pilot interface extending there from and a first particular wireless intercom inside, a remove-before-flight flag, an aircraft hanger hook, a wireless tug operator's headset, and a first particular carrying case with a 120/240 VAC NiMH charger for the intercom and a 120/240 VAC 9 VDC wall supply for the wireless tug operator's headset that together form a first kit. A second embodiment includes an intercom bag with a wired pilot interface extending there from and a second particular wireless intercom inside, a remove-before-flight flag, an aircraft hanger hook, a wireless tug operator's headset, a wireless trainer's headset, and a second particular carrying case with a 120/240 VAC NiMH charger for the intercom and a 120/240 VAC 9 VDC charger for the wireless tug operator's headset that together form a second kit. A third embodiment includes an intercom bag with a wired pilot interface extending there from and a third particular wireless intercom inside, a remove-before-flight flag, an aircraft hanger hook, a wireless tug operator's headset, two wireless wing walkers headsets, and a third particular carrying case with a 120/240 VAC NiMH charger for the intercom and three 120/240 VAC 9 VDC chargers for the wireless tug operator's headset and the two wing walkers' headsets that together form a third kit. A fourth embodiment includes first and third kits together in a fourth kit. A fifth embodiment includes second and third kits together in a fifth kit. A sixth embodiment includes first, second, and third kits together in a sixth kit.

In all embodiments, each wireless intercom includes a pilot-alert feature that sends an audible alarm to the pilot's headset and preferably to any other headsets in use if the wireless intercom loses contact with the signal from the tug operator's headset. This feature reduces the likelihood that the aircraft may take off with the intercom bag and intercom still attached by the hanger hook. In all embodiments, the carrying cases may have rollers.

Sonetics Corporation of Portland Oreg. markets these embodiments and has experienced unexpected commercial success and copying by competitors in this market.

More particularly, the invention provides a wireless ground support system for communicating between a ground crew and a pilot, in which the pilot has a pilot's headset communicatively linked to a communication socket accessible from the exterior of an aircraft operable on the ground by the pilot, such that audio signals communicated to the communications socket may be heard by the pilot during ground operations, the system including: a wireless ground crew tug operator's headset; a first wireless intercom having a wired pilot interface able to couple at least voice communications between the ground crew tug operator's headset and the communications socket, at least partially over a first wireless link; and a logic within the first wireless intercom able to transmit an audio alarm signal to the communications socket if the ground crew tug operator's headset fails to maintain communication over the wireless link. The wireless ground support system, including a first kit further including at least one of: an intercom bag for releasably enclosing the wireless intercom; a remove-before-flight safety flag that is releasably attachable to the intercom bag; and a mechanical coupling for releasably fastening at least one of the intercom bag and the wireless intercom to the aircraft. The wireless ground support system, including the first kit further including: a custom, weather-resistant case for securely containing at least the wireless intercom, the wired pilot interface, the ground crew tug operator's headset, the intercom bag, the remove-before-flight safety flag, and the mechanical coupling. The wireless ground support system, where the wireless link includes a full-duplex link with a noise gate. The wireless ground support system, where the wireless link includes an open microphone link. The wireless ground support system, where the intercom bag includes: a weather-resistant fabric having a safety color; the fabric configured into a size and shape for receiving the first wireless intercom; the fabric supporting an attachment point for the remove-before flight safety flag; the fabric supporting an attachment point for the mechanical coupling; a first opening for passing the wired pilot interface through the intercom bag to the first wireless intercom; and a second opening providing access to an ON/OFF switch of the first wireless intercom. The wireless ground support system, including a second kit further including a wireless trainer headset. The wireless ground support system, including at least additional circuitry in the first wireless intercom to create a second wireless intercom able to provide: an open microphone link between the ground crew tug operator's headset and the trainer's headset; an open microphone link from the communications socket to the ground crew tug operator's headset; a push-to-talk link from the ground crew tug operator's headset to the communications socket; a push-to-talk link from the trainer's headset to the communications socket; and where the push-to-talk link from the trainer's headset to the communications socket has priority over the push-to-talk link from the ground crew tug operator's headset to the communications socket. The wireless ground support system, including the second kit further including: a second custom weather resistant case for securely containing at least the second wireless intercom, the wired pilot interface, the ground crew tug operator's headset, the trainer's headset, an intercom bag, a remove-before-flight safety flag, and a mechanical coupling for releasably fastening at least one of the intercom bag and the second wireless intercom to the aircraft. The wireless ground support system, where: at least a portion a visible surface of the ground crew tug operator's headset includes a first safety color; and at least a portion a visible surface of the trainer's headset includes a second safety color. The wireless ground support system, including a third kit further including: a first wing walker headset; and at least one second wing walker headset. The wireless ground support system, including at least additional circuitry in the first wireless intercom to create a third wireless intercom able to provide: an open microphone link from the communications socket to the ground crew tug operator's headset; an open microphone link from the communications socket to the first wing walker headset; at least one open microphone link from the communications socket to the at least one second wing walker headset; an open microphone link from the ground crew tug operator's headset to the first wing walker headset; at least one open microphone link from the ground crew tug operator's headset to the at least one second wing walker headset; a push-to-talk link between the first wing walker headset and the at least one second wing walker headset; a push-to-talk link from the first wing walker headset to the ground crew tug operator's headset; a push-to-talk link from the at least one second wing walker headset to the ground crew tug operator's headset; and a control logic within the wireless intercom implementing a priority scheme for multiple simultaneous communications to the ground crew tug operator's headset. The wireless ground support system, including a push-to-talk link from the ground crew tug operator's headset to the communication socket or an open microphone link from the ground crew tug operator's headset to the communication socket. The wireless ground support system, including the third kit further including: a third custom weather resistant case for securely containing at least the third wireless intercom, the wired pilot interface, the ground crew tug operator's headset, the first wing-walker headset, the at least one second wing walker headset, an intercom bag, a remove-before-flight safety flag, and a mechanical coupling for releasably fastening at least one of the intercom bag and the wireless intercom to the aircraft. The wireless ground support system, where the at least one second wing walker headset includes a plurality of second wing walker headsets, each the second wing walker headset able as a linked node on the wireless ground support system, the system further including at least an open microphone link from the ground crew tug operator's headset to each second wing walker headset of the plurality of second wing walker headsets; a push-to-talk link between the first wing walker headset and each the second wing walker headset of the plurality of second wing walker headsets; a push-to-talk link from each the second wing walker headset of the plurality of second wing walker headsets to the ground crew tug operator's headset; and a push-to-talk link between each pair of the second wing walker headsets of the plurality of the second wing walker headsets.

A wireless ground support system for communicating between a ground crew and a pilot, in which the pilot has a pilot's headset communicatively linked to a communication socket accessible from the exterior of an aircraft on the ground such that audio signals communicated to the communications socket may be heard by the pilot during ground operations, the system including a first kit further including: a wireless ground crew tug operator's headset; a first wireless intercom having a wired pilot interface able to couple at least voice communications between the ground crew tug operator's headset and the communications socket, at least partially over a first wireless link, where the first wireless link includes a full-duplex link with a noise gate; a circuit within the wireless intercom able to transmit an audio alarm signal through the wired pilot interface to the communications socket if the ground crew tug operator's headset fails to maintain communication over the first wireless link; an intercom bag for containing the wireless intercom; and a mechanical coupling for releasably fastening at least one of the intercom bag and the wireless intercom to the aircraft; a remove-before-flight safety flag; and a first custom weather resistant case for securely containing at least the wireless intercom, the wired pilot interface, the ground crew tug operator's headset, the intercom bag, the remove-before-flight safety flag, and the mechanical coupling. The wireless ground support system, comprising a second kit further including: a wireless trainer's headset; circuitry additional to and within the first wireless intercom to provide a second wireless intercom able to additionally provide: communications between the trainer's headset and the communication socket at least partially over a second open microphone wireless link; communications between the ground crew tug operator's headset and the trainer's headset at least partially over a third wireless open microphone link; and where the second and third wireless links comprise second and third full-duplex links each with a noise gate; a logic within the wireless intercom able to implement a priority scheme that gives audio signals from the wireless trainer's headset priority over audio signals from the ground crew tug operator's headset. The wireless ground support system, comprising a third kit further including: at least one wing-walker's headset; additional circuitry to the first wireless intercom to provide a third wireless intercom able to additionally provide: an open microphone link from the communications socket to the at least one wing-walker's headset; a push-to-talk link from the at least one wing-walker's headset to the ground crew tug operator's headset; at least one open microphone link from the ground crew tug operator headset to the at least one wing-walker headset; where the third wireless intercom includes control logic able to enforce a predetermined priority scheme; and where if the at least one wing-walker's headset includes a plurality of the wing-walker headsets, a push-to-talk link between each pair of the wing-walker headsets of the plurality of the wing-walker headsets.

A wireless ground support system for communicating between a ground crew and a pilot, in which the pilot has a pilot's headset communicatively linked to a communication socket accessible from the exterior of an aircraft on the ground such that audio signals communicated to the communications socket may be heard by the pilot during operations, the system including: a wireless ground crew tug operator's headset; a wireless ground crew trainer's headset; a wireless intercom having a wired pilot interface able to couple at least voice communications between the ground crew tug operator's headset and the communications socket, at least partially over a wireless link, where the wireless link includes a full-duplex link and a noise gate; the wireless intercom further able to provide: an open microphone link between the ground crew tug operator's headset and the trainer's headset; an open microphone link from the communications socket to the ground crew tug operator's headset; a push-to-talk link from the ground crew tug operator's headset to the communications socket; a push-to-talk link from the trainer's headset to the communications socket; and where the push-to-talk link from the trainer's headset to the communications socket has priority over the push-to-talk link from the ground crew tug operator's headset to the communications socket. The wireless ground support system, further including: a circuit within the wireless intercom able to transmit an audio alarm signal through the wired pilot interface to the communications socket if the ground crew tug operator's headset fails to maintain communication over the wireless link; an intercom bag able to releasably enclose the wireless intercom, where the intercom bag includes: a weather-resistant fabric having a safety color; the fabric formed into a size and shape for receiving the wireless intercom; the fabric supporting an attachment point for a remove-before flight safety flag; the fabric supporting an attachment point for a mechanical coupling; a first opening for passing the wired pilot interface through the intercom bag to the wireless intercom; and a second opening providing access to an ON/OFF switch of the wireless intercom; the mechanical coupling for releasably fastening the intercom bag to the aircraft; the remove-before-flight safety flag; a custom weather-resistant case for securely containing at least the wireless intercom, the wired pilot interface, the ground crew tug operator's headset, the wireless ground crew trainer's headset; the intercom bag, the remove-before-flight safety flag, and the mechanical coupling, where the case, the wireless intercom, the wired pilot interface, the ground crew tug operator's headset, the wireless ground crew trainer's headset, the intercom bag, the remove-before-flight safety flag, and the mechanical coupling comprise a kit.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In the description below, signals described as being sent to or from persons are meant to indicate signals sent to or from the personal transceivers of those persons, such as the exemplary headsets described below.

Figure 1:
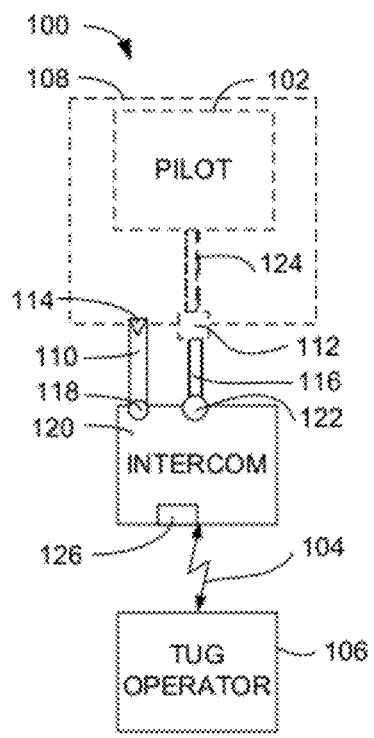
FIG. 1 is a diagrammatic view illustrating a first exemplary embodiment of the wireless ground support system, according to a preferred embodiment of the present invention.

FIG. 1 is a diagrammatic view illustrating a first exemplary embodiment of the wireless ground support system 100, according to a preferred embodiment of the present invention. The wireless ground support system 100 provides open-microphone (hereinafter "open mic") communications between a pilot 102 in a cockpit of an aircraft 108 and a tug operator 106 outside the aircraft 108 over wireless communications link 104 via a wired pilot interface 116 and intercom 120. "Open mic" means that the pilot 102 and the tug operator 106 can talk and be heard each by the other at any time. Wireless communications link 104 is preferably a full duplex link with a noise gate and a range of fifteen-hundred feet.

The wireless ground support system 100 is for communicating between a ground crew 106 and a pilot 102, in which the pilot 102 has a pilot's headset communicatively linked 124 to a communication socket 112 accessible from the exterior of an aircraft 108 operable on the ground by such pilot 102, such that audio signals communicated to such communications socket 112 from outside such aircraft 108 may be heard by such pilot 102 during ground operations. As the aircraft 108 and the communications socket 112 are not part of the present invention, audio signals intended for the pilot 102 will sometimes herein be referred to as being sent to or from the communications socket 112, with the inference that such audio signals go to or from the pilot 102, respectively. Communications socket 112 receives jack 214 (see FIG. 2) at a first end of the wired pilot interface 116 and intercom 120 receives a second send of wired pilot interface 116 in intercom socket 122.

Figure 2:
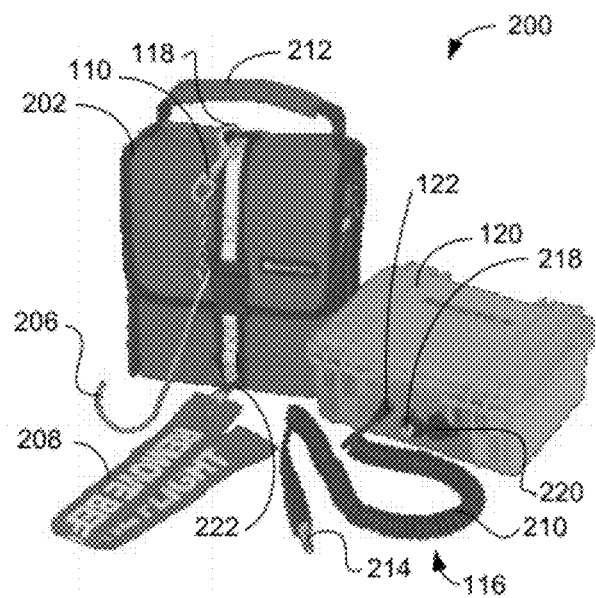
FIG. 2 is a front perspective view illustrating an exemplary intercom bag and an exemplary pilot interface and wireless intercom normally used within the exemplary remove-before-flight bag, according to a preferred embodiment of the present invention.

Intercom 120 is releasably mechanically coupled to the aircraft 108 during use via attachment device 114 on mechanical coupling 110, which attachment device 114 may be hanger hook 206 (see FIG. 2). During operations, mechanical coupling 110 releasably attaches to either intercom 120 or an intercom bag 202 (see FIG. 2) that contains intercom 120, at attachment point 118. The mechanical coupling 110 and wired pilot interface 116 are used in all embodiments described herein.

Figure 3:
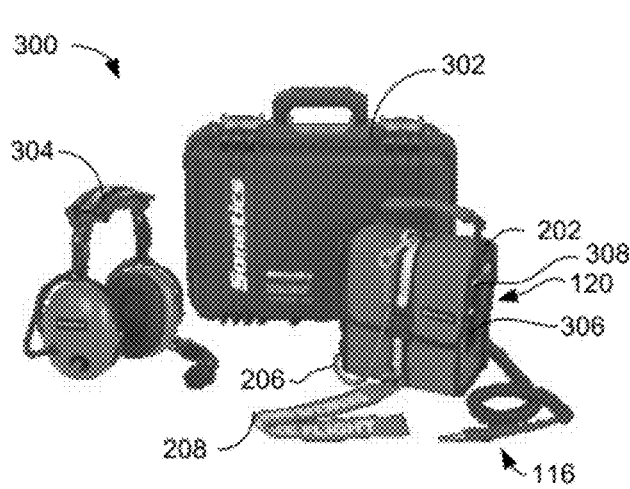
FIG. 3 is a front perspective view illustrating the exemplary intercom bag with the exemplary pilot interface and with the wireless intercom inside, an exemplary wireless tug operator's headset, and an exemplary system carrying case for a first embodiment system, according to a preferred embodiment of the present invention.

Wireless intercom 120 has a pilot-alert logic 126, or alarm 126, that alerts the pilot 102 via an audible alarm if the wireless intercom 120 loses the link 104 from the tug operator's headset 304 (see FIG. 3). For example, if the tug operator 106, with his headset 304, moves out of range of the wireless intercom 120, thereby failing to maintain communication over said wireless link 104, the pilot 102 will be alerted. This protects the aircraft 108 and all aboard against the possibility of the aircraft 108 taking off with the intercom bag 202 and the wireless intercom 120 still attached to the aircraft 108. If the intercom bag 202 were left attached to the aircraft 108 as the aircraft 108 taxied out to take off, then the alarm 126 would sound after the aircraft 108 was more than fifteen hundred feet from the tug operator's headset 304. In an alternate embodiment, the alarm 126 may also have a visual component, such as a light attached to or adjacent to the intercom bag 202 and able to flash responsive to a loss of signal from the tug operator's headset 304. In another alternate embodiment, the alarm 126 may also have a visual component, such as a light attached to the tug operator's headset 304 and responsive to a loss of signal from the intercom 120 to flash. In yet another alternate embodiment, the alarm 126 may be heard and/or seen via the wing walkers' headsets 906 and 908 (see FIG. 9) and the trainer's headset 608 (see FIG. 6).

FIG. 2 is a front perspective view illustrating an exemplary intercom bag 202 and an exemplary pilot interface 116 and wireless intercom 120 normally used within the exemplary intercom bag 202, according to a preferred embodiment of the present invention. Preferably, the wireless intercom 120 is a WPB-71N single-user pushback intercom marketed by Sonetics Corporation of Portland, Oreg., which has a line-of-sight transmission range of fifteen hundred feet. The wireless intercom 120 has a coiled audio signal cord 210 with an audio jack 214 that can be inserted into a complimentary communications socket 112 on the exterior of the aircraft to connect the wireless intercom 120 to the cockpit communications system and specifically to the headset used by pilot 102. The "exterior of the aircraft" includes, without limitation, surfaces that are accessible to ground personnel when the landing gear is deployed and the aircraft 108 has landed. The coiled audio signal cord 210 together with the audio jack 214 create a wired pilot interface 116 to the intercom 120. The connection between jack 214 and the communications socket 112, like all the other connections to the wireless intercom 120, is weather resistant. Wireless intercom 120 has an internal rechargeable battery with a twenty-hour battery life per charge and a recharger coupling 220.

Intercom bag 202 is a padded bag made of weather-resistant ballistic nylon that carries the wireless intercom 120 during aircraft ground operations. Intercom bag 202 preferably has a carrying handle 212 and a remove-before-flight safety flag 208 that attaches to the intercom bag 202 at attachment point 222. A side of intercom bag 202 has openings 306 and 308 (See FIG. 3) for coiled audio signal cord 210 to extend out of intercom bag 202 and for user access to an ON/OFF power switch 218 for the wireless intercom 120, respectively. Aircraft hanger hook 206 is releasably attachable to the intercom bag 202 and is used to literally hang the intercom bag 202 from the aircraft 108 during aircraft ground operations. Intercom bag 202 is preferably a safety color, such as bright red, to improve visual recognition, as are the remove-before-flight safety flag 208 and the ear cups of the wireless tug operator's headset 304. In alternate embodiments, other safety colors, as are known in the art of emergency service equipment, may be used. Intercom bag 202 can be releasably fastened shut.

FIG. 3 is a front perspective view illustrating the exemplary intercom bag 202 with the exemplary pilot interface 116 and with the wireless intercom 120 inside, an exemplary wireless tug operator's headset 304, and an exemplary first carrying case 302 for a first embodiment system, according to a preferred embodiment of the present invention. Wireless tug operator's headset 304 communicates wirelessly with the wireless intercom 120. Preferably, the wireless tug operator's headset 304 is an FHW-740 wireless headset marketed by Sonetics Corporation of Portland, Oreg., which features an internal rechargeable battery with a twelve-hour battery life per charge. The first carrying case 302 is sized to hold the intercom bag 202 with the exemplary pilot interface 116, aircraft hanger hook 206, wireless intercom 120, and the wireless tug operator's headset 304, as well as a 120/240 VAC NiMH charger (not shown) for the intercom and a 120/240 VAC 9 VDC charger (not shown) for the wireless tug operator's headset 304. Preferably, the system carrying case 302 is a Storm Case® weather tight carrying case custom manufactured by Hardigg Industries, Inc. of South Deerfield, Mass., and marketed with the wireless ground support system 100 as kit 300 by Sonetics Corp. of Portland Oreg. The 120/240 VAC NiMH charger for the intercom and the 120/240 VAC 9 VDC charger for the headset are preferably those provided by Sonetics Corp. of Portland, Oreg.

In a preferred embodiment, carrying case 302 has rollers (not shown) to facilitate mobility. In an alternate embodiment, carrying case 302 may be sized to carry additional equipment used by the ground crew, such as wands, flashlights, and safety vests. Some advantages of carrying case 302, in comparison to a leading competitor which does not provide a case 302, are improved convenience and safety for the ground crew and increased longevity for the equipment.

While the devices marketed by Sonetics Corporation are preferred in all embodiments, substitution of devices of equivalent functionality from other sources is within the scope of the invention.

It will be appreciated that intercom bag 202 with the exemplary pilot interface 116 and wireless intercom 120, the wireless tug operator's headset 304, and the system carrying case 302 with the 120/240 VAC NiMH charger (not shown) for the wireless intercom 120 and a 120/240 VAC 9 VDC charger (not shown) for the wireless tug operator's headset 304 together form a kit 300.

Figure 4:
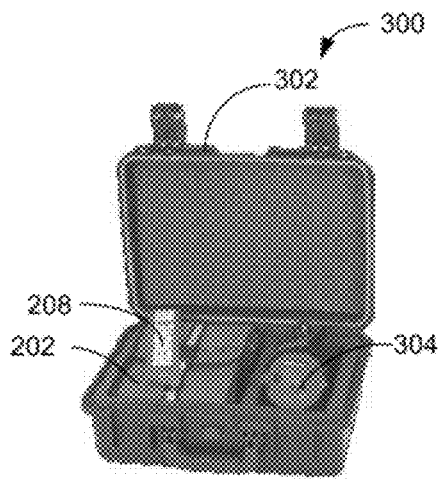
FIG. 4 is a front perspective view illustrating the exemplary system carrying case in a packed configuration, according to a preferred embodiment of the present invention.

FIG. 4 is a front perspective view illustrating the exemplary system carrying case 302 in a packed configuration, according to a preferred embodiment of the present invention. The intercom bag 202, with the exemplary pilot interface 116 and with the wireless intercom 120 inside, the wireless tug operator's headset 304, and the remove-before-flight flag 208 can be seen. The 120/240 VAC NiMH charger (not shown) for the intercom and a 120/240 VAC 9 VDC charger (not shown) for the wireless tug operator's headset 304 are not visible in this view. Also not shown, but included, is the aircraft hanger hook 206. Preferably, kit 300 is sold in this configuration, but shipped and stored with carrying case 302 closed.

Figure 5A:
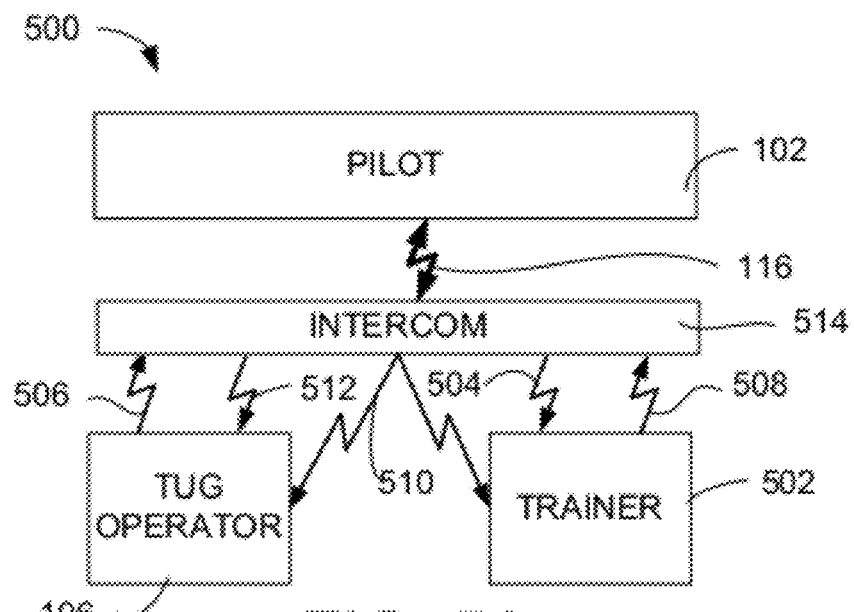
FIG. 5A is a diagrammatic view illustrating the communication links of a second exemplary embodiment of the wireless ground support system, according to a preferred embodiment of the present invention.

FIG. 5A is a diagrammatic view illustrating the communication links of a second exemplary embodiment of the wireless ground support system 500, according to a preferred embodiment of the present invention. The second embodiment of the wireless ground support system 500 is for training purposes. Pilot 102 has open mic wireless connections 512 and 504 to the tug operator 106 and to the trainer 502, respectively, via wired pilot interface 116 to wireless intercom 514. The tug operator 106 and the trainer 502 have push-to-talk wireless communications links 506 and 508, respectively, to the pilot 102 via wireless intercom 514 and wired pilot interface 116. The trainer 502 and tug operator 106 have an open mic wireless communication link 510 between them, via wireless intercom 514. All links are via the wireless intercom 514. Accordingly, the tug operator 106 can always hear the trainer 502 and the pilot 102. In the event that tug operator 106 and the trainer 502 are both trying to talk to the pilot 102 at once, the trainer 502 has priority, as enforced by the logic 516 in the wireless intercom 514 for the second embodiment. All communications links 504, 506, 508, 510, and 512 are full duplex links with noise gates and have a line-of sight range of fifteen hundred feet. Wireless ground support system 500 has the pilot-alert feature 126 as described above, for warning the pilot 102 when the wireless intercom 514 loses the signal from the tug operator headset 610 (See FIG. 6). In a preferred embodiment, the pilot alert warning is also sent to the trainer 502. In a preferred embodiment, a loss of signal alert warning is also provided to the tug operator 106 from within the tug operator's headset 610 (See FIG. 6).

In an alternate embodiment, the link 506 from the tug operator 106 to the pilot 102 may be an open mic link 506. In an alternate embodiment, the link 508 from the trainer 502 to the pilot 102 may be an open mic link 508.

Figure 5B:
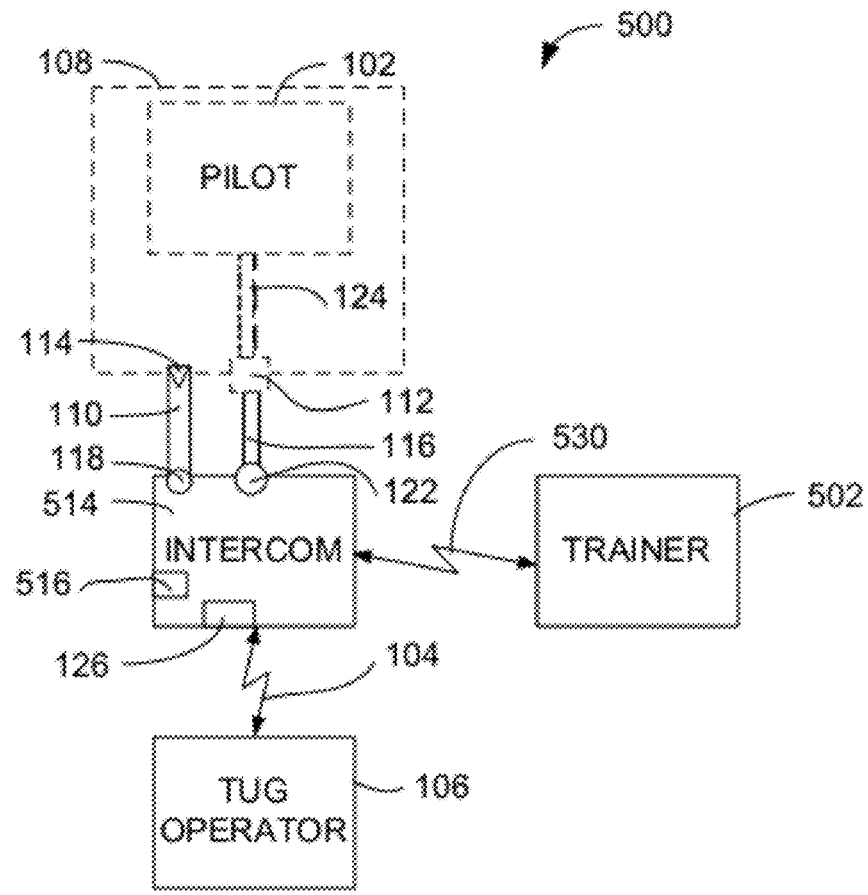
FIG. 5B is a diagrammatic view illustrating the second exemplary embodiment of the wireless ground support system 500, according to the preferred embodiment of FIG. 5A.

FIG. 5B is a diagrammatic view illustrating the second exemplary embodiment of the wireless ground support system 500, according to the preferred embodiment of FIG. 5A. Similar to wireless ground support system 100, wireless ground support system 500 has a wireless intercom 514 that provides wireless communication 530 (includes communications links 504, 508, and 510) between the trainer 502 and the wireless intercom 514. Logic 516 enforces the priority scheme between the trainer's headset 608 and the tug operator's headset 610.

Figure 6:
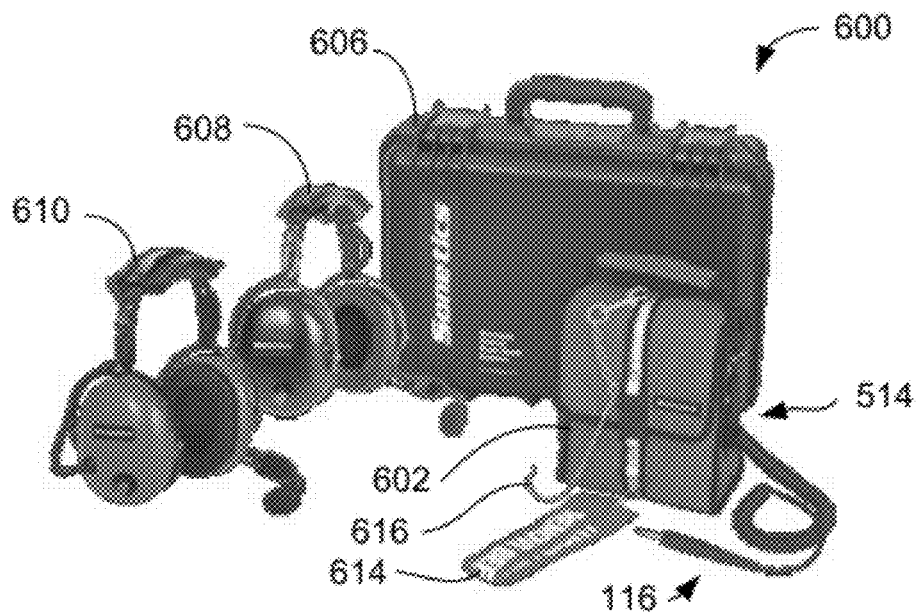
FIG. 6 is a front perspective view illustrating an exemplary intercom bag with the exemplary pilot interface and with the exemplary wireless intercom inside, an exemplary tug operator wireless headset, an exemplary trainer's wireless headset, and an exemplary second carrying case for a second embodiment system, according to a preferred embodiment of the present invention.

FIG. 6 is a front perspective view illustrating an exemplary intercom bag 602 with the exemplary pilot interface 116 and with the exemplary wireless intercom 514 inside, an exemplary tug operator wireless headset 610, an exemplary trainer's wireless headset 608, and an exemplary second carrying case 606 for a second embodiment system, according to a preferred embodiment of the present invention. Intercom bag 602 is preferably identical to the corresponding intercom bag 202 from wireless ground support system 100, with identical or corresponding wired pilot interface 116, remove-before-flight flag 614, and the aircraft hanger hook 616. Inside intercom bag 602 is a wireless intercom 514 that provides wireless intercom services for two headsets 608 and 610 and a wired interface 116 to the pilot 102. Wireless intercom 514 is preferably a WPB-72N trainer pushback intercom marketed by Sonetics Corp. of Portland, Oreg. that has an internal rechargeable battery with a twenty-hour battery life, per charge. Tug operator's headset 610 is preferably an FHW-710 wireless headset marketed by Sonetics Corp of Portland, Oreg., and has bright red (safety color) ear cups and an internal rechargeable battery with a twelve-hour battery life, per charge. The trainer's headset 608 is preferably an FHW-710 wireless headset marketed by Sonetics Corp of Portland, Oreg., and has black ear cups and an internal rechargeable battery with a twelve-hour battery life, per charge. In an alternate embodiment, the trainer's headset 608 has a second safety color. Carrying case 606 is preferably a Storm Case® weather tight carrying case custom manufactured by Hardigg Industries, Inc. of South Deerfield, Mass., and marketed with the wireless ground support system 500 as kit 600 by Sonetics Corp. of Portland Oreg. Carrying case 606 is sized for the larger wireless ground support system 500 and preferably has rollers (not shown). Not shown, but included in the wireless ground support system 500, are a 120/240 VAC NiMH charger for the wireless intercom 514 and two 120/240 VAC 9 VDC chargers, one for the wireless tug operator's headset 610 and one for the wireless trainer's headset 608.

Taken together, the intercom bag 602 with the wired pilot interface 116, the wireless intercom 514, the tug operator wireless headset 610, the trainer's wireless headset 608, the system carrying case 606, wired pilot interface 116, the remove-before-flight flag 614, the aircraft hanger hook 616, the 120/240 VAC NiMH charger, and the two 120/240 VAC 9 VDC chargers form a kit 600.

Figure 7:
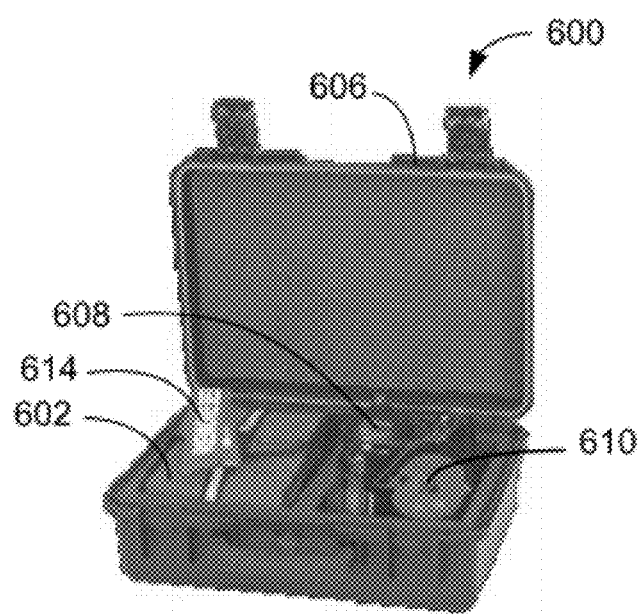
FIG. 7 is a front perspective view illustrating an exemplary embodiment of the second carrying case in a packed configuration, according to a preferred embodiment of the present invention.

FIG. 7 is a front perspective view illustrating the exemplary embodiment of the second carrying case 606 in a packed configuration, according to a preferred embodiment of the present invention. Wireless bag 602 with wireless intercom 514 inside, trainer's headset 608, tug-operator's headset 610, and remove-before-flight flag 614 can be clearly seen. Not shown, but also packed in carrying case 606 are the aircraft hanger hook 616, and the 120/240 VAC NiMH charger, and the two 120/240 VAC 9 VDC chargers, and wired pilot interface 612. Preferably, kit 600 is sold in this configuration, but shipped and stored with carrying case 606 closed.

Figure 8A:
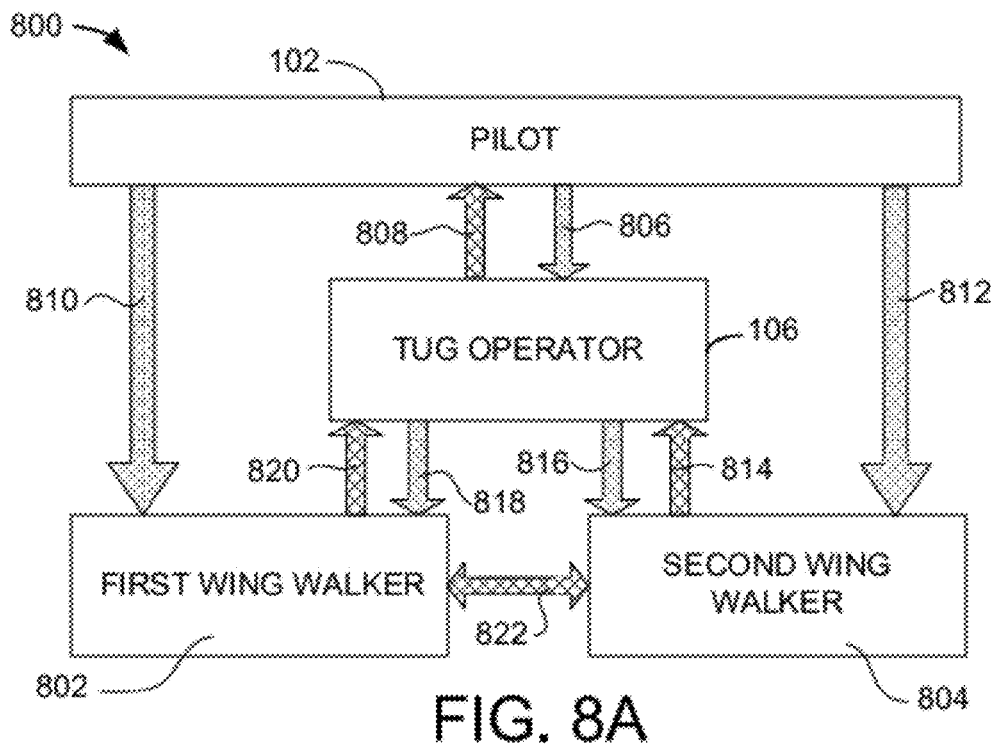
FIG. 8A is a diagrammatic view illustrating a third exemplary embodiment of the communication links of the wireless ground support system, according to a preferred embodiment of the present invention.

FIG. 8A is a diagrammatic view illustrating the communication links of a third exemplary embodiment of the wireless ground support system 800, according to a preferred embodiment of the present invention. FIG. 8A illustrates links 806, 808, 810, 812, 814, 816, 818, 820, and 822, all of which are links through wireless intercom 850 (See FIG. 8B). The pilot communicates via wireless open mic links 810, 806, and 812 to a first wing walker 802, the tug operator 106, and the second wing walker 812, respectively. The tug operator 106 communicates via wireless open mic links 818 and 816 to first and second wing walkers 802 and 804, respectively. First and second wing walkers 802 and 804, respectively, can communicate with each other via push-to-talk wireless link 822, and can communicate with the tug operator 106 via push-to-talk wireless links 820 and 814, respectively. Tug operator 106 can communicate to the pilot 102 through push-to-talk wireless link 808. Accordingly, the entire ground crew can hear the pilot 102 and the tug operator 106, but only the tug operator 106 can talk to the pilot 102. This priority scheme is enforced by logic 860 in wireless intercom 850. All exemplary communications links 806, 808, 810, 812, 814, 816, 818, 820, and 822 are full duplex links with noise gating and have a line-of sight range of fifteen hundred feet.

In an alternate embodiment, the link 808 from the tug operator 106 to the pilot 102 may be an open mic link 808.

Figure 9:
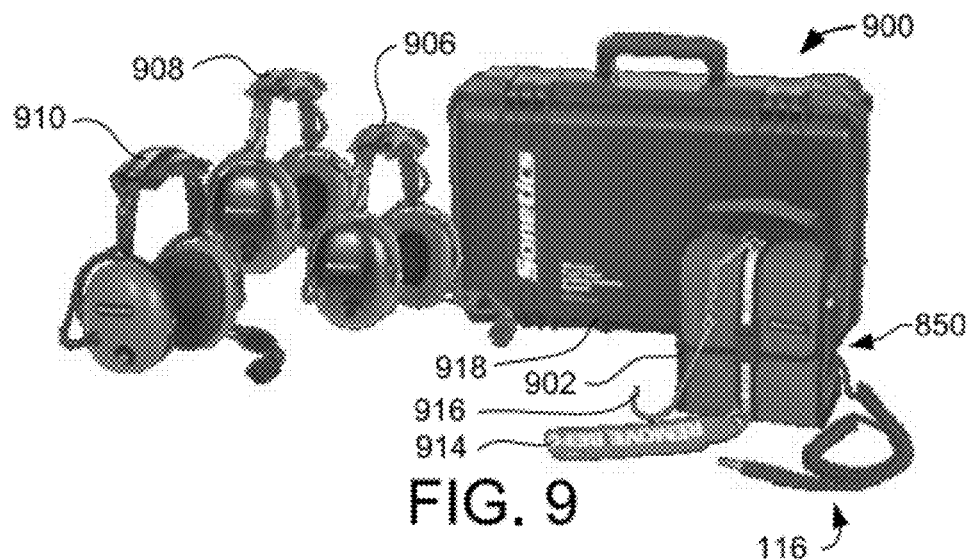
FIG. 9 is a front perspective view illustrating an exemplary intercom bag with the exemplary pilot interface and with the exemplary wireless intercom inside, an exemplary tug operator wireless headset, first and second exemplary wing-walker's wireless headsets, and a thirf exemplary carrying case for the third embodiment system, according to a preferred embodiment of the present invention.

Wireless ground support system 800 has the pilot-alert feature 126 as described above, for warning the pilot 102 when the wireless intercom 850 loses the signal from the tug operator headset 910 (See FIG. 9). In a preferred embodiment, a pilot-alert warning is also supplied to the wing walkers 802 and 804. If a trainer 502 is added to the wireless ground support system 800, the trainer preferably also receives a pilot-alert warning signal. If additional wing walkers 802, 804 are added to the wireless ground support system 800, those additional wing walkers 802, 804 preferably also receive a pilot-alert warning signal.

Figure 8B:
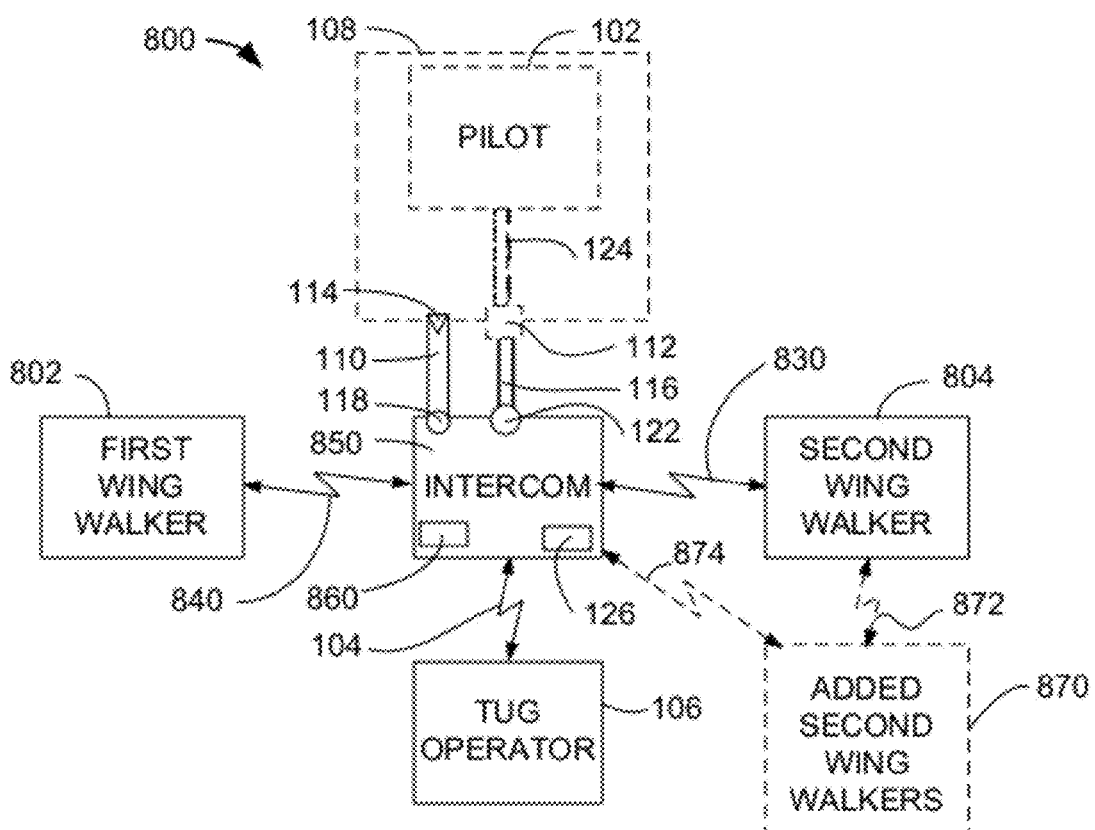
FIG. 8B is a diagrammatic view illustrating the third exemplary embodiment of the wireless ground support system, according to the preferred embodiment of FIG. 8A.

FIG. 8B is a diagrammatic view illustrating the third exemplary embodiment of the wireless ground support system 800, according to the embodiment of FIG. 8A. Wireless ground support system 800 is similar to wireless ground support systems 100 and 500, but with wireless intercom 850 providing communications services 840 (includes communications links 810, 820, 818, and 822) and 830 (includes communications links 812, 814, 816, and 822) for the first wing walker 802 and the second wing walker 804, respectively. Wireless ground support system 800 has the pilot-alert feature 126 as described above, for warning the pilot 102 when the wireless intercom 850 loses the signal from the tug operator headset 910 (See FIG. 9). In a preferred embodiment, the pilot alert warning is also sent to the first wing walker 802 and to second wing walker 804. In a preferred embodiment, a loss of signal alert warning is also provided to the tug operator 106 from within the tug operator's headset 910.

Optionally, additional second wing walkers 870 may be added to system 800. Wing walkers 804 and 870 have headsets with push-to-talk communications 872 between them (made of communication services 874 and 830 through wireless intercom 850). Each headset is a linked node.

FIG. 9 is a front perspective view illustrating an exemplary intercom bag 902 with the exemplary wired pilot interface 116 and with the wireless intercom 850 inside, an exemplary tug operator wireless headset 910, first and second exemplary wing-walker's wireless headsets 906 and 908, and an exemplary third carrying case 918 for the third embodiment system 800, according to a preferred embodiment of the present invention. Intercom bag 902 is preferably identical to intercom bag 202, as is the pilot interface 116, the remove-before-flight flag 914, and the aircraft hanger hook 916. Inside intercom bag 902 is a wireless intercom 850 that provides wireless intercom services for three headsets 906, 908 and 910 and a wired connection 116 to the pilot 102. Wireless intercom 850 is preferably a three-user pushback intercom marketed by Sonetics Corp. of Portland, Oreg. that has an internal rechargeable battery with a twenty-hour battery life, per charge. The WPB-73N wireless intercom 850 can provide intercom services for up to four tug operators 106 and four wing walkers 802, as well as the pilot 102. In a particular embodiment, a wireless ground support system 800 may be configured for up to four wing walkers 802 and one tug operator 106. In another particular embodiment, wireless ground support system 800 may be configured for one tug operator 106, one trainer 502, and three wing walkers 802. Other configurations, within the boundaries of a wireless intercom 850 for one pilot 102, one tug operator 106, an optional trainer 502, and a plurality of wing walkers 802, are within the scope of the invention.

Tug operator's headset 910 is preferably an FHW-710 wireless headset marketed by Sonteics Corp of Portland, Oreg., and has bright safety red ear cups and an internal rechargeable battery with a twelve-hour battery life, per charge. The first and second wing walkers' headsets 908 and 910 are preferably an FHW-720 wireless headset marketed by Sonteics Corp of Portland, Oreg., and have black ear cups and internal rechargeable batteries each with a twelve-hour battery life, per charge. In a particular embodiment, the first and second wing walkers' headsets 908 and 910 have a second safety color. Carrying case 918 is preferably a Storm Case® weather tight carrying case custom manufactured by Hardigg Industries, Inc. of South Deerfield, Mass., and marketed with the wireless ground support system 800 as kit 900 by Sonetics Corp. of Portland Oreg. Not shown but included in the wireless ground support system kit 900 are a 120/240 VAC NiMH charger for the wireless intercom 904 and three 120/240 VAC 9 VDC chargers, one for the wireless tug operator's headset 910 and one for each of the first and second wing walker's headsets 906 and 908. Carrying case 918 is sized for the larger wireless ground support system 900. In an alternate embodiment, carrying case 918 may be sized to accommodate additional ground crew equipment. In a preferred embodiment, carrying case 918 has rollers to facilitate mobility.

Taken together, the intercom bag 902 with the wired pilot interface 116, the wireless intercom 850, the tug operator wireless headset 910, the first and second wing walker's headsets 906 and 908, the exemplary system carrying case 918, wired pilot interface 116, the remove-before-flight flag 914, the aircraft hanger hook 916, the 120/240 VAC NiMH charger, and the three 120/240 VAC 9 VDC chargers form a kit 900. Kits with additional wing walker headsets 906 and/or a trainer's headset 608 are within the scope of the invention, and preferably include a carrying case 918 sized for the particular kit, including a charger for each additional headset.

Figure 10:
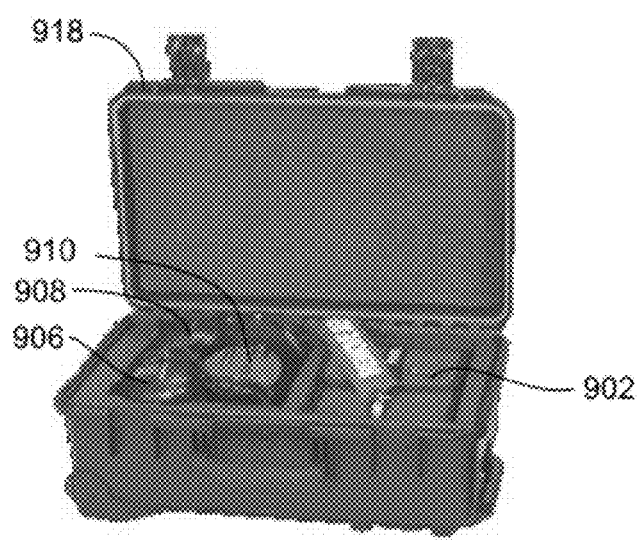
FIG. 10 is a front perspective view illustrating an exemplary third system carrying case in a packed configuration, according to a preferred embodiment of the present invention.

FIG. 10 is a front perspective view illustrating an exemplary third carrying case 918 in a packed configuration, according to a preferred embodiment of the present invention. Wireless bag 902, wireless intercom 850, first and second wing walker's headsets 906 and 908, tug-operator's headset 910, and remove-before-flight flag 916 can be clearly seen. Not shown, but also packed in carrying case 918 are the aircraft hanger hook 916, the 120/240 VAC NiMH charger, and the three 120/240 VAC 9 VDC chargers. Preferably, kit 900 is sold in this configuration, but shipped and stored with carrying case 918 closed.

In all embodiments, carrying case 302, 606, and/or 918 may optionally include an attachment means, such as a lanyard, for securing the carrying case 302, 606, and/or 918 to a tug, a flight line tie-down, or similar fixed flight line feature, to avoid it being blown about by the wind or jet-induced air currents.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

In the claims below, the word "such" is intended to refer to a an item that is not part of the invention, while the word "said" is used to refer to elements of the invention.

We claim:

1. A wireless ground support system for communicating between a ground crew and a pilot, in which the pilot has a pilot's headset communicatively linked to a communication socket accessible from the exterior of an aircraft operable on the ground by such pilot, such that audio signals communicated to such communications socket may be heard by such pilot during ground operations, the system comprising:
   a. a wireless ground crew tug operator's headset;
   b. a first wireless intercom having a wired pilot interface operable to couple at least voice communications between said ground crew tug operator's headset and such communications socket, at least partially over a first wireless link; and c. a logic within said first wireless intercom operable to transmit an audio alarm signal to such communications socket if said ground crew tug operator's headset fails to maintain communication over said first wireless link.

2. The wireless ground support system of claim 1, comprising a first kit further comprising:
a. an intercom bag for releasably enclosing said wireless intercom;
b. a remove-before-flight safety flag that is releasably attachable to said intercom bag; and
c. a mechanical coupling for releasably fastening at least one of said intercom bag and said first wireless intercom to such aircraft.

3. The wireless ground support system of claim 2, comprising said first kit further comprising: a custom, weather-resistant case for securely containing at least said wireless intercom, said wired pilot interface, said ground crew tug operator's headset, said intercom bag, said remove-before-flight safety flag, and said mechanical coupling.

4. The wireless ground support system of claim 1, wherein said wireless link comprises a full-duplex link with a noise gate.

5. The wireless ground support system of claim 1, wherein said logic within said first wireless intercom operable to transmit an audio alarm signal to such communications socket is further operable to at least one of:
a. transmit said audio alarm signal to at least one wireless wing walker's headset;
b. transmit said audio alarm signal to a wireless trainer's headset;
c. activate a visual alarm proximate said first wireless intercom;
d. activate a visual alarm on said wireless ground crew tug operator's headset;
e. activate a visual alarm on said at least one wireless wing walker's headset; and
f. activate a visual alarm on said wireless trainer's headset.

6. The wireless ground support system of claim 2, wherein said intercom bag comprises:
a. a weather-resistant fabric having a safety color;
b. said fabric configured into a size and shape for receiving said first wireless intercom;
c. said fabric supporting an attachment point for said remove-before flight safety flag;
d. said fabric supporting an attachment point for said mechanical coupling;
e. a first opening for passing said wired pilot interface through said intercom bag to said first wireless intercom; and
f. a second opening providing access to an ON/OFF switch of said first wireless intercom.

7. The wireless ground support system of claim 1, comprising a second kit further comprising a wireless trainer headset.

8. The wireless ground support system of claim 7, comprising at least additional circuitry in said first wireless intercom to create a second wireless intercom operable to provide:
a. an open microphone link between said ground crew tug operator's headset and said trainer's headset;
b. an open microphone link from such communications socket to said ground crew tug operator's headset;
c. a push-to-talk link from the ground crew tug operator's headset to such communications socket;

d. a push-to-talk link from the trainer's headset to such communications socket; and
e. wherein said push-to-talk link from said trainer's headset to such communications socket has priority over said push-to-talk link from said ground crew tug operator's headset to such communications socket.

9. The wireless ground support system of claim 7, comprising said second kit further comprising: a second custom weather resistant case for securely containing at least said second wireless intercom, said wired pilot interface, said ground crew tug operator's headset, said trainer's headset, an intercom bag, a remove-before-flight safety flag, and a mechanical coupling for releasably fastening at least one of said intercom bag and said second wireless intercom to such aircraft.

10. The wireless ground support system of claim 7, wherein:
a. at least a portion a visible surface of said ground crew tug operator's headset comprises a first safety color; and
b. at least a portion a visible surface of said trainer's headset comprises a second safety color.

11. The wireless ground support system of claim 1, comprising a third kit further comprising:
a. a first wing walker headset; and
b. at least one second wing walker headset.

12. The wireless ground support system of claim 11, comprising at least additional circuitry in said first wireless intercom to create a third wireless intercom operable to provide:
a. an open microphone link from such communications socket to said ground crew tug operator's headset;
b. an open microphone link from such communications socket to said first wing walker headset;
c. an open microphone link from such communications socket to said at least one second wing walker headset;
d. an open microphone link from said ground crew tug operator's headset to said first wing walker headset;
e. at least one open microphone link from said ground crew tug operator's headset to said at least one second wing walker headset;
f. at least one push-to-talk link between said first wing walker headset and said at least one second wing walker headset;
g. a push-to-talk link from said first wing walker headset to said ground crew tug operator's headset;
h. a push-to-talk link from said at least one second wing walker headset to said ground crew tug operator's headset; and
i. a control logic within said wireless intercom implementing a priority scheme for multiple simultaneous communications to said ground crew tug operator's headset.

13. The wireless ground support system of claim 12, comprising one of:
a. a push-to-talk link from said ground crew tug operator's headset to such communication socket; and
b. an open microphone link from said ground crew tug operator's headset to such communication socket.

14. The wireless ground support system of claim 12, comprising said third kit further comprising a third custom weather resistant case for securely containing at least said third wireless intercom, said wired pilot interface, said ground crew tug operator's headset, said first wing-walker headset, said at least one second wing walker headset, an intercom bag, a remove-before-flight safety flag, and a mechanical coupling for releasably fastening at least one of said intercom bag and said third wireless intercom to such aircraft.

15. The wireless ground support system of claim 11, wherein said at least one second wing walker headset comprises a plurality of second wing walker headsets, each said second wing walker headset operable as a linked node on said wireless ground support system, said system further comprising at least:
   a. an open microphone link from said ground crew tug operator's headset to each said second wing walker headset of said plurality of second wing walker headsets;
   b. a push-to-talk link between said first wing walker headset and each said second wing walker headset of said plurality of second wing walker headsets;
   c. a push-to-talk link from each said second wing walker headset of said plurality of second wing walker headsets to said ground crew tug operator's headset; and
   d. a push-to-talk link between each pair of said second wing walker headsets of said plurality of said second wing walker headsets.

16. A wireless ground support system for communicating between a ground crew and a pilot, in which the pilot has a pilot's headset communicatively linked to a communication socket accessible from the exterior of an aircraft on the ground such that audio signals communicated to said communications socket may be heard by such pilot during ground operations, the system comprising a first kit further comprising:
   a. a wireless ground crew tug operator's headset;
   b. a first wireless intercom having a wired pilot interface operable to couple at least voice communications between said ground crew tug operator's headset and such communications socket, at least partially over a first wireless link, wherein said first wireless link comprises a full-duplex link with a noise gate;
   c. a logic within said wireless intercom operable to transmit an audio alarm signal through said wired pilot interface to such communications socket if said ground crew tug operator's headset fails to maintain communication over said first wireless link;
   d. an intercom bag for containing said wireless intercom;
   e. a mechanical coupling for releasably fastening at least one of said intercom bag and said wireless intercom to such aircraft;
   f. a remove-before-flight safety flag; and
   g. a first custom weather resistant case for securely containing at least said first wireless intercom, said wired pilot interface, said ground crew tug operator's headset, said intercom bag, said remove-before-flight safety flag, and said mechanical coupling.

17. The wireless ground support system of claim 16, comprising a second kit further comprising:
   a. a wireless trainer's headset;
   b. circuitry additional to and within said first wireless intercom to provide a second wireless intercom operable to additionally provide:
      i. communications between said trainer's headset and such communication socket at least partially over a second open microphone wireless link;
      ii. communications between said ground crew tug operator's headset and said trainer's headset at least partially over a third wireless open microphone link;
      iii. wherein said second and third wireless links comprise second and third full-duplex links each with a noise gate; and
      iv. a logic within said wireless intercom operable to implement a priority scheme that gives audio signals from said wireless trainer's headset priority over audio signals from said ground crew tug operator's headset.

18. The wireless ground support system of claim 16, comprising a third kit further comprising:
   a. at least one wing-walker's headset;
   b. additional circuitry to said first wireless intercom to provide a third wireless intercom operable to additionally provide:
      i. at least one open microphone link from such communications socket to said at least one wing-walker's headset;
      ii. a push-to-talk link from said at least one wing-walker's headset to said ground crew tug operator's headset;
      iii. at least one open microphone link from said ground crew tug operator headset to said at least one wing-walker headset;
      iv. wherein said third wireless intercom comprises control logic operable to enforce a predetermined priority scheme; and
      v. if said at least one wing-walker's headset comprises a plurality of said wing-walker headsets, a push-to-talk link between each pair of said wing-walker headsets of said plurality of said wing-walker headsets.

19. A wireless ground support system for communicating between a ground crew and a pilot, in which the pilot has a pilot's headset communicatively linked to a communication socket accessible from the exterior of an aircraft on the ground such that audio signals communicated to said communications socket may be heard by such pilot during operations, the system comprising:
   a. a wireless ground crew tug operator's headset;
   b. a wireless ground crew trainer's headset;
   c. a wireless intercom having a wired pilot interface operable to couple at least voice communications between said ground crew tug operator's headset and such communications socket, at least partially over a wireless link, wherein said wireless link comprises a full-duplex link and a noise gate;
   d. said wireless intercom further operable to provide:
      i. an open microphone link between said ground crew tug operator's headset and said trainer's headset;
      ii. an open microphone link from such communications socket to said ground crew tug operator's headset;
      iii. a push-to-talk link from the ground crew tug operator's headset to such communications socket;
      iv. a push-to-talk link from the trainer's headset to such communications socket; and
      v. wherein said push-to-talk link from said trainer's headset to such communications socket has priority over said push-to-talk link from said ground crew tug operator's headset to such communications socket.

20. The wireless ground support system of claim 19, further comprising:
   a. a circuit within said wireless intercom operable to transmit an audio alarm signal through said wired pilot interface to such communications socket if said ground crew tug operator's headset fails to maintain communication over said wireless link;
   b. an intercom bag operable to releasably enclose said wireless intercom, wherein said intercom bag comprises:
      i. a weather-resistant fabric having a safety color;
      ii. said fabric formed into a size and shape for receiving said wireless intercom;

iii. said fabric supporting an attachment point for a remove-before flight safety flag;
iv. said fabric supporting an attachment point for a mechanical coupling;
v. a first opening for passing said wired pilot interface through said intercom bag to said wireless intercom; and
vi. a second opening providing access to an ON/OFF switch of said wireless intercom;
c. said mechanical coupling for releasably fastening said intercom bag to such aircraft;
d. said remove-before-flight safety flag;
e. a custom weather-resistant case for securely containing at least said wireless intercom, said wired pilot interface, said ground crew tug operator's headset, said wireless ground crew trainer's headset, said intercom bag, said remove-before-flight safety flag, and said mechanical coupling, wherein said case, said wireless intercom, said wired pilot interface, said ground crew tug operator's headset, said wireless ground crew trainer's headset, said intercom bag, said remove-before-flight safety flag, and said mechanical coupling comprise a kit.

* * * * *